(12) United States Patent
Wang (10) Patent No.: US 12,232,916 B2
(45) Date of Patent: Feb. 25, 2025

(54) INTEGRATED DEVICE FOR WASHING AND BRUSHING TEETH

(71) Applicant: Xilai Wang, Huizhou (CN)

(72) Inventor: Xilai Wang, Huizhou (CN)

( * ) Notice: Subject to any disclaimer, the term of this patent is extended or adjusted under 35 U.S.C. 154(b) by 289 days.

(21) Appl. No.: 17/978,602

(22) Filed: Nov. 1, 2022

(65) Prior Publication Data

US 2024/0138966 A1 May 2, 2024

(51) Int. Cl.

| | |
|---|---|
| *A61C 17/22* | (2006.01) |
| *A46B 9/04* | (2006.01) |
| *A46B 11/06* | (2006.01) |
| *A46B 13/04* | (2006.01) |
| *A46B 15/00* | (2006.01) |
| *A61C 17/20* | (2006.01) |
| *F04B 17/03* | (2006.01) |

(52) U.S. Cl.
CPC .............. *A61C 17/221* (2013.01); *A46B 9/04* (2013.01); *A46B 11/063* (2013.01); *A46B 13/04* (2013.01); *A46B 15/0004* (2013.01); *A61C 17/20* (2013.01); *F04B 17/03* (2013.01)

(58) Field of Classification Search
CPC ...... A61C 17/20; A61C 17/225; A61C 17/221; A46B 11/063; A46B 9/04; A46B 13/04; A46B 15/0004
See application file for complete search history.

(56) References Cited

U.S. PATENT DOCUMENTS

| | | | |
|---|---|---|---|
| 2007/0041779 A1* | 2/2007 | Kuo ................... | A61C 17/227 401/270 |
| 2018/0110601 A1* | 4/2018 | Mighall ............... | A61C 17/36 |
| 2018/0289458 A1* | 10/2018 | Follows .............. | A46B 9/04 |
| 2019/0105141 A1* | 4/2019 | Zhou .................. | A61C 17/06 |
| 2021/0338376 A1* | 11/2021 | Senff ................. | A61C 17/0205 |

* cited by examiner

*Primary Examiner* — Andrew A Horton
(74) *Attorney, Agent, or Firm* — JEEN IP LAW, LLC (57) ABSTRACT

The invention discloses an integrated device for washing and brushing teeth, in particular to the technical field of oral care. The main body of the integrated device for washing and brushing teeth comprises a toothbrush head, a shell, a water pump assembly and an acoustic motor communicated with the water pump assembly; The toothbrush head is installed at one end of the shell, a water outlet pipeline is arranged in the toothbrush head, and at least two water outlet holes communicated with the water outlet pipeline are arranged on the bristle surface of the toothbrush head; The inside of the shell is provided with a cavity, and the water pump assembly and the acoustic motor are both installed in the cavity.

7 Claims, 7 Drawing Sheets

INTEGRATED DEVICE FOR WASHING AND BRUSHING TEETH

TECHNICAL FIELD

The invention belongs to the technical field of oral care, in particular to an integrated device for washing and brushing teeth.

BACKGROUND

In the related art, electric toothbrushes usually remove dirt from teeth by means of high-frequency vibration. Compared with traditional manual toothbrushes, this electric toothbrush has better cleaning effect. However, it is still difficult for electric toothbrushes to remove the dirt deep between teeth. Based on this, the industry has developed a tooth washer, whose principle is to pressurize the natural flowing water into high-pressure water through the pump body, so as to achieve the purpose of washing and/or massaging the teeth' gaps and gums, thus realizing all-round tooth cleaning.

However, the electric toothbrush and tooth washer in the related art are independent products, which are inconvenient to operate in use, and the vibration power of the electric toothbrush is small, so the cleaning effect can be limited; and in the use process, it occupies a large space, is inconvenient to carry and has high manufacturing cost.

SUMMARY

In order to overcome the above shortcomings of the prior art, the embodiment of the present invention provides an integrated device for washing and brushing teeth, so as to solve the problems mentioned in the above background.

To achieve the above purpose, the invention provides the following technical scheme: the main body of the integrated device for washing and brushing teeth comprises a toothbrush head, a shell, a water pump assembly and an acoustic motor communicated with the water pump assembly;

The toothbrush head is installed at one end of the shell, a water outlet pipeline is arranged in the toothbrush head, and at least two water outlet holes communicated with the water outlet pipeline are arranged on the bristle surface of the toothbrush head;

The inside of the shell is provided with a cavity; and the water pump assembly and the acoustic motor are both installed in the cavity;

The water pump assembly comprises a high-pressure water pump and a motor matched with the high-pressure water pump, wherein the high-pressure water pump is a high-pressure plunger pump or a high-pressure electromagnetic pump, and the pressure of the high-pressure water pump is set at 90-180 PSI;

The acoustic motor is a magnetic suspension motor, and its vibration frequency is set at 32,000-50,000 Hz.

In a preferred embodiment, it also comprises a bracket body 1 and a bracket body 2, wherein the water pump assembly is arranged between the bracket body 1 and the bracket body 2, and the acoustic motor is arranged on the bracket body 1 and close to one end of the toothbrush head, wherein the bracket body 1 and the bracket body 2 are connected by buckles or screws to fix the high-pressure water pump.

In a preferred embodiment, the acoustic Madanes is provided with a vibration shaft, and a water passing hole is formed in the vibration shaft;

The water passing hole at one end of the vibration shaft is communicated with the water outlet pipeline inside the toothbrush head;

The water passing hole at the other end of the vibration shaft is communicated with the water outlet of the water pump assembly.

In a preferred embodiment, one side of the bracket body 1 and the bracket body 2 is also provided with a control board, and a plurality of function switches are welded on the control board.

In a preferred embodiment, the position of the surface part of the shell corresponding to the function switch is provided with key bodies, and the key bodies penetrate through the shell and are in press connection with the function switch, wherein the number of key bodies is matched with the function switch.

In a preferred embodiment, the integrated brushing and brushing device further comprises a battery installed in the housing cavity, and the battery is arranged on one side of two surface parts of the bracket body.

In a preferred embodiment, the high-pressure water pump, the acoustic motor and the battery are all electrically connected with the control board.

In a preferred embodiment, the end of the shell is also fixed with an end cap by screws or buckles, and one side of the end cap is provided with an adapter;

One end of the adapter is connected with a water inlet pipe;

The other end of the adapter is communicated with the water inlet of the water pump assembly.

Technical Effects and Advantages of the Invention

According to the invention, a plurality of water outlets are arranged on the bristle surface of the toothbrush head, so that the washing area is increased; the water pressure of the water outlets is effectively increased by arranging the high-pressure water pump; meanwhile, the high-frequency magnetic suspension motor is arranged between the water outlet end of the water pump assembly and the water outlet pipeline inside the toothbrush head; when in use, the water is pressurized to wash teeth and teeth gaps; meanwhile, the high-frequency vibration of the high-frequency magnetic suspension motor can be used to more effectively clean tartar and food residues in the teeth gaps, so that the functions of brushing teeth and washing teeth can be realized simultaneously.

The attached figures are: 1 main body, 2 toothbrush heads, 21 water outlet pipes, 22 water outlet holes, 3 shells, 4 water inlet pipes, 5 key bodies, 6 sonic motors, 61 vibration shafts, 7 Bracket 1, 8 Bracket 2, 9 water pump assembly, 91 high-pressure water pump, 92 motor, 10 battery, 11 control panel, 111 function switch, 12 end cap and 13 adapter.

DETAILED DESCRIPTION

The technical solutions in the embodiments of the present invention will be clearly and completely described below with reference to the drawings in the embodiments of the present invention. Obviously, the described embodiments are only part of the embodiments of the present invention, but not all of them. Based on the embodiment of the present invention, all other embodiments obtained by ordinary technicians in the field without creative labor are within the scope of the present invention.

Figure 1:
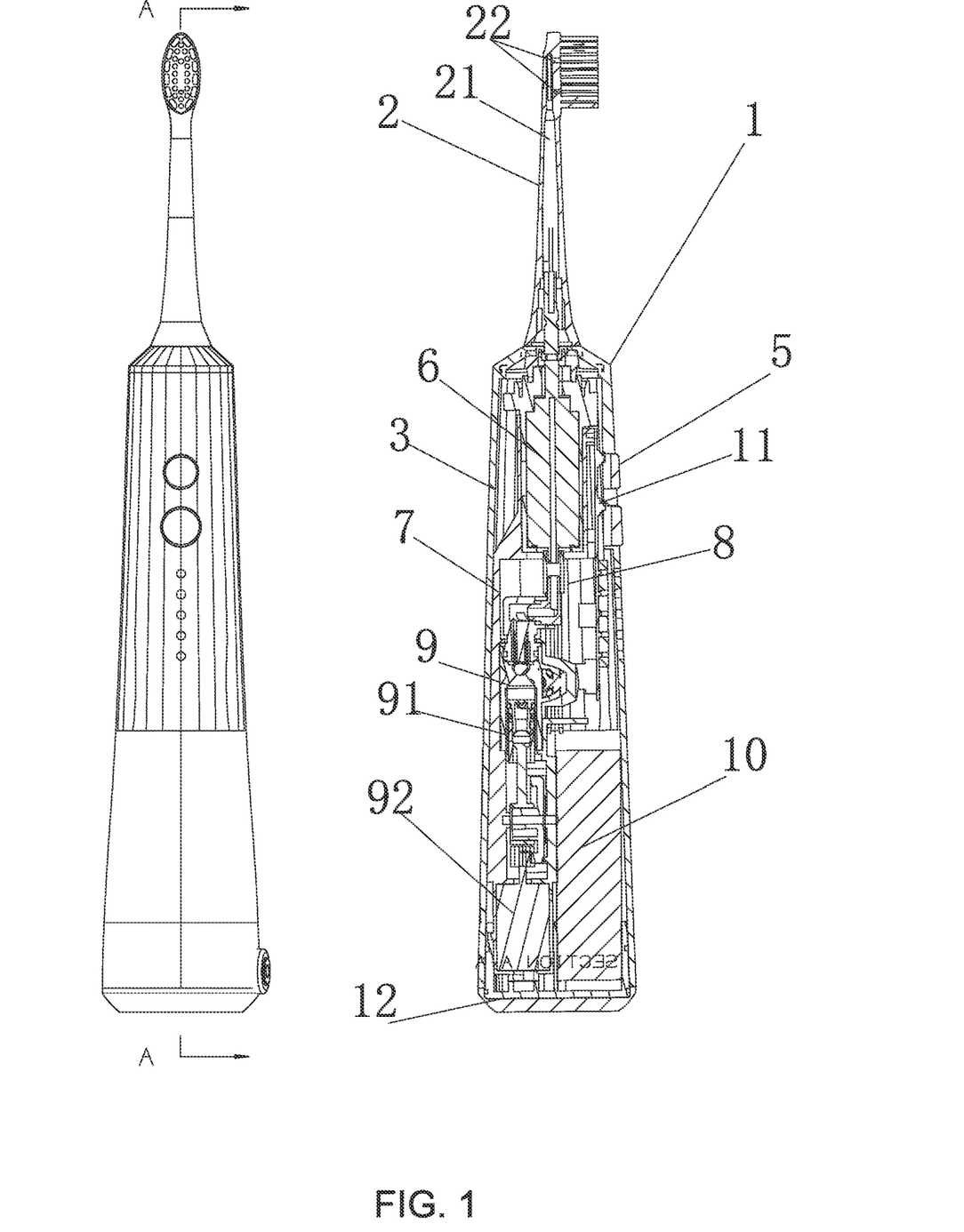
FIG. 1 is a sectional view of the main body of the present invention.
Figure 2:
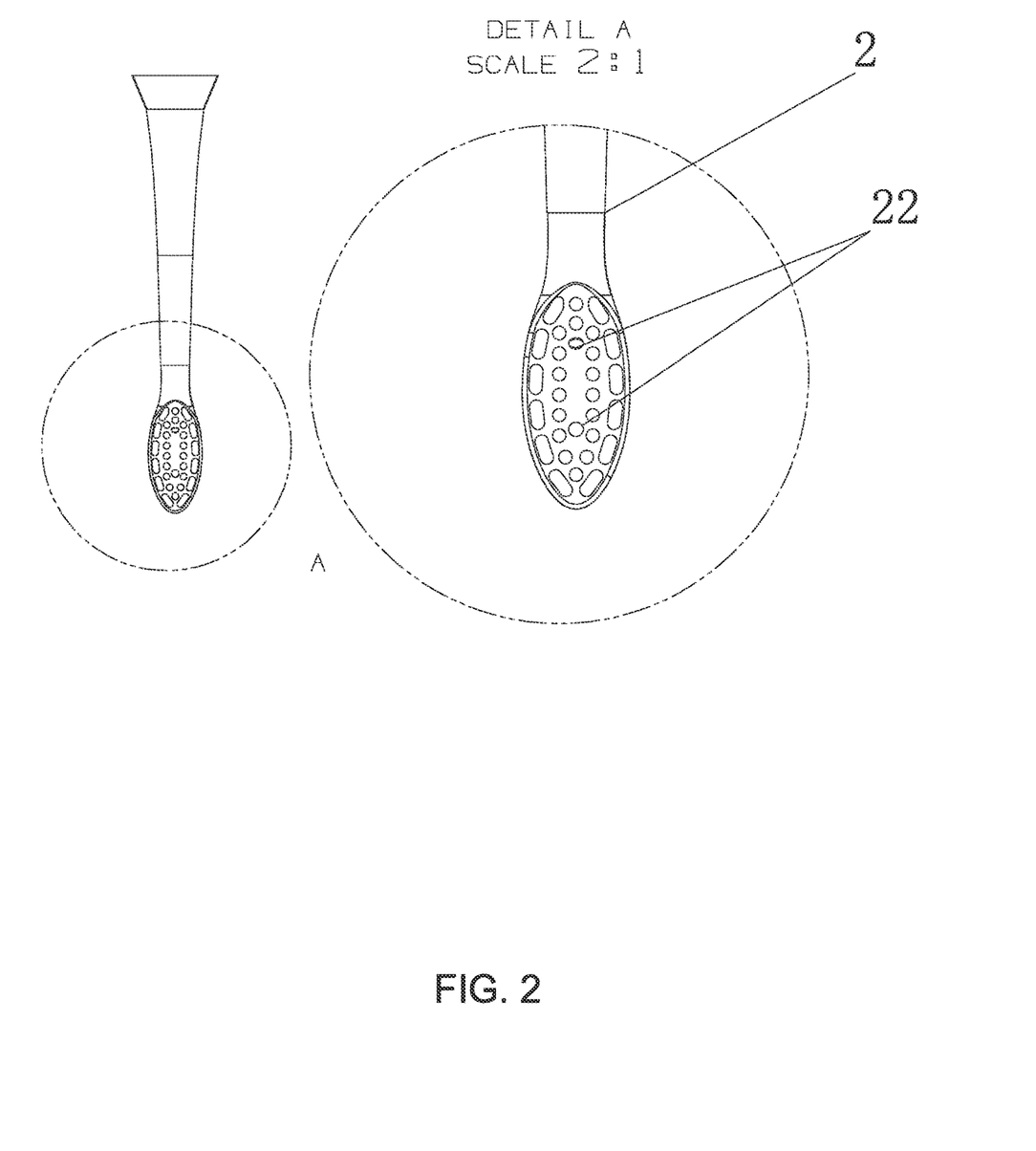
FIG. 2 is a schematic diagram of the structure of the toothbrush head in the present invention.
Figure 5:
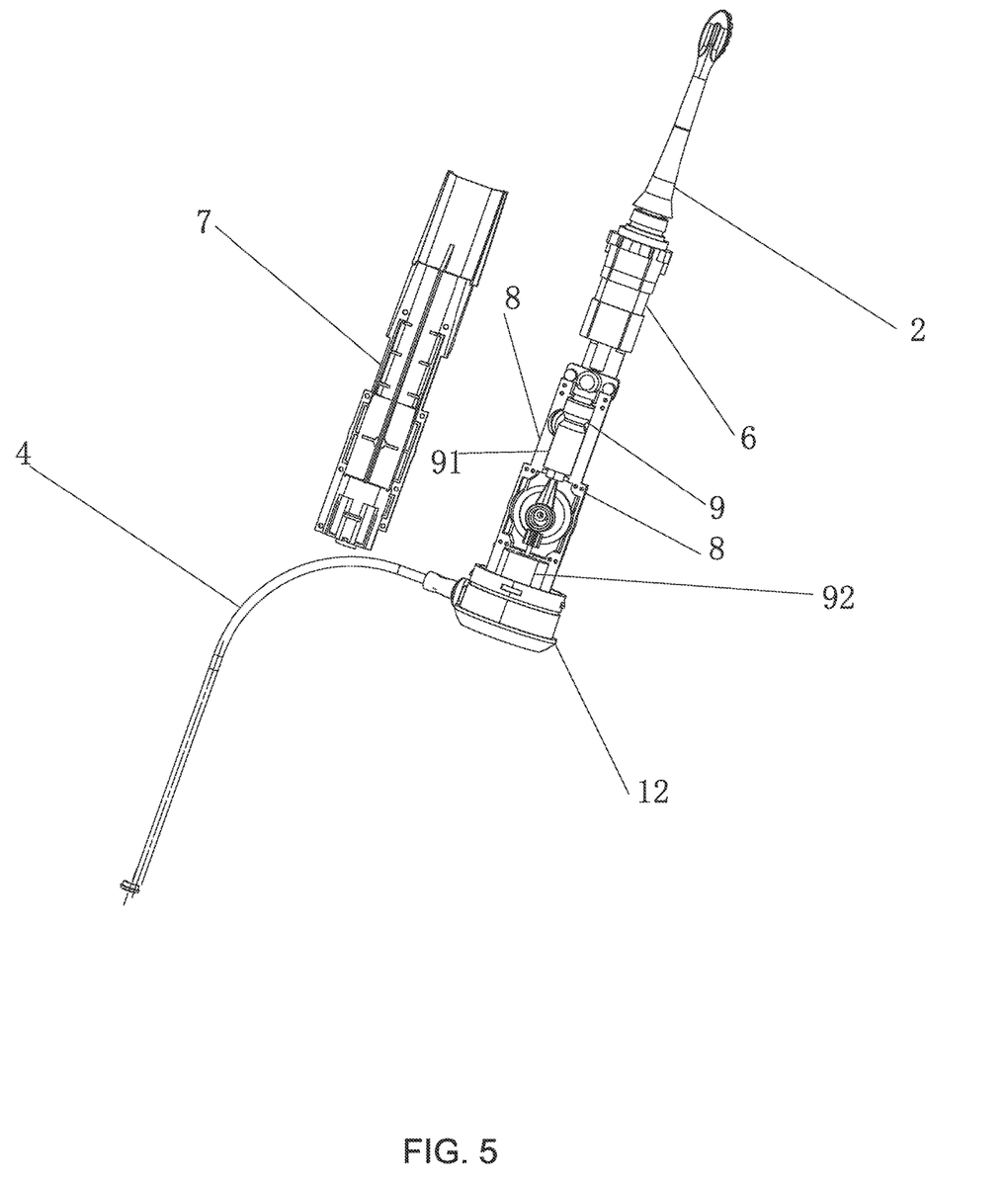
FIG. 5 is a schematic diagram of the internal structure of the present invention.

As shown in FIG. 1-FIG. 7, an integrated device for washing and brushing teeth comprises a main body 1, a toothbrush head 2, a shell 3, a water inlet pipe 4, a key body 5, Acoustic motor 6, vibration shaft 61, bracket 1 7, bracket 2 8, water pump assembly 9, high-pressure water pump 91, motor 92, battery 10, control panel 11, function switch 111, An end cover 12 and an adapter 13, wherein the main body 1 of the integrated device for washing and brushing teeth comprises a toothbrush head 2, a shell 3, a water pump assembly 9 and an acoustic motor 6 communicated with the water pump assembly 9;

The toothbrush head 2 is installed at one end of the housing 3, a water outlet pipe 21 is arranged inside the toothbrush head 2, and at least two water outlet holes 22 communicated with the water outlet pipe 21 are formed on the bristle surface of the toothbrush head 2;

The inside of the shell 3 has a cavity, and the water pump assembly 9 and the acoustic motor 6 are both installed in the cavity.

Figure 3:
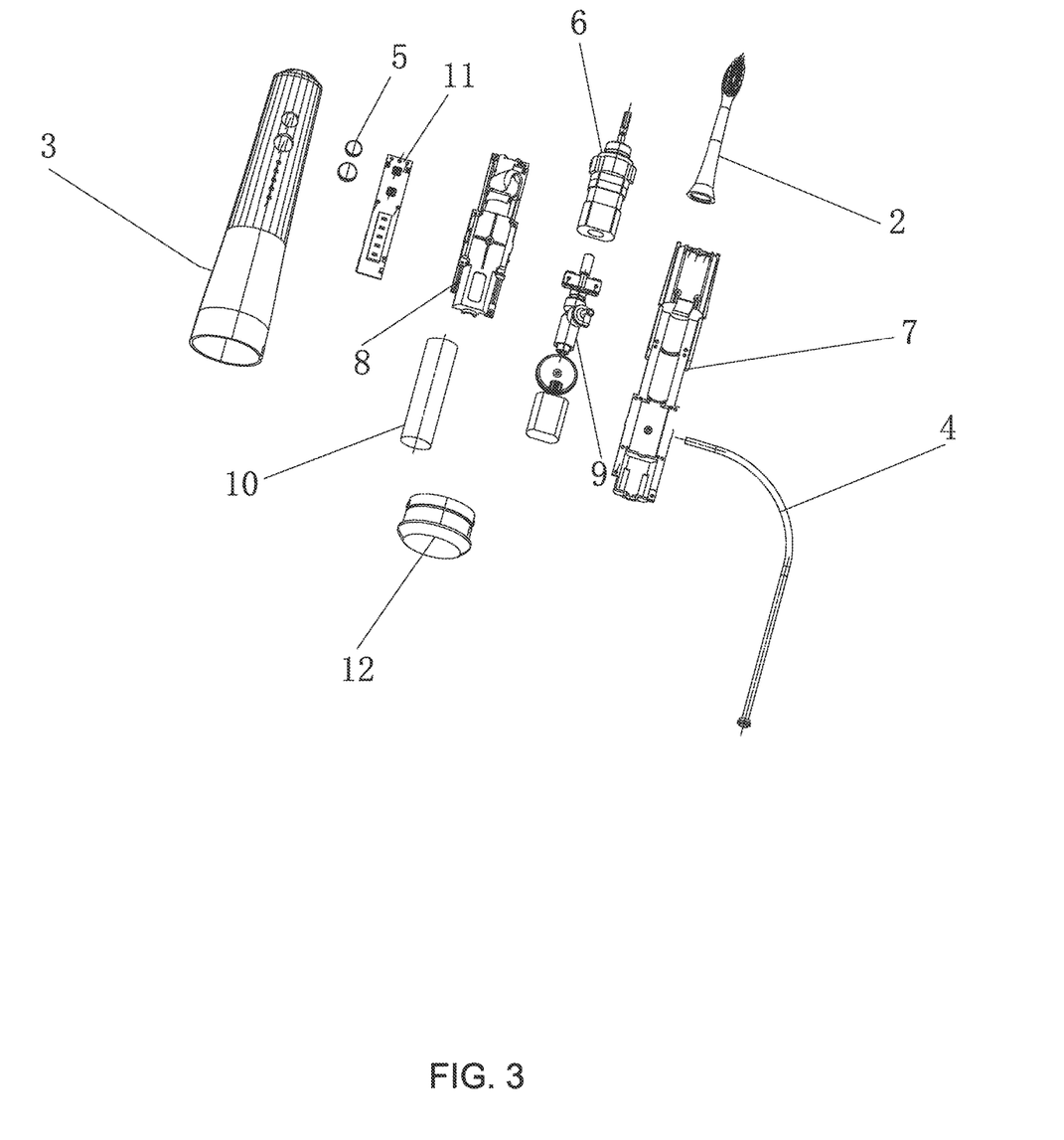
FIG. 3 is a schematic diagram of the overall explosion structure of the present invention.
Figure 7:
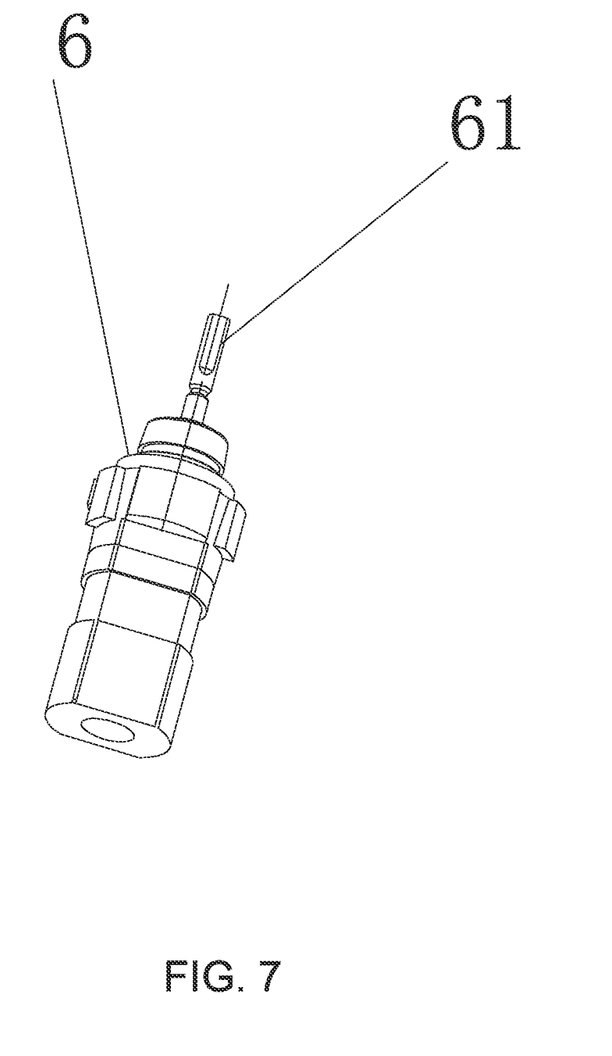
FIG. 7 is a structural diagram of the acoustic motor and vibration shaft in the present invention.

The water pump assembly 9 comprises a high-pressure water pump 91 and a motor 92 which are matched with the high-pressure water pump 91, wherein the high-pressure water pump 91 is a high-pressure plunger pump or a high-pressure electromagnetic pump, and the pressure of the high-pressure water pump 91 is set at 90-180 PSI;

The acoustic motor 6 is a magnetic suspension motor, and its vibration frequency is set at 32,000-50,000 Hz.

In some embodiments, it also includes a bracket body 1 7 and a bracket body 2 8, the water pump assembly 9 is arranged between the bracket body 1 7 and the bracket body 2 8, and the acoustic motor 6 is arranged on the bracket body 1 7 and close to one end of the toothbrush head 2, wherein the bracket body 1 7 and the bracket body 2 8 are connected by buckles or screws to fix the high-pressure water pump 9.

A vibration shaft 61 is arranged in the acoustic motor 6, and a water passing hole is formed in the vibration shaft 61;

The water passing hole at one end of the vibration shaft 61 is communicated with the water outlet pipe 21 inside the toothbrush head 2;

The water passing hole at the other end of the vibration shaft 61 is connected with the water outlet of the water pump assembly 9.

Figure 6:
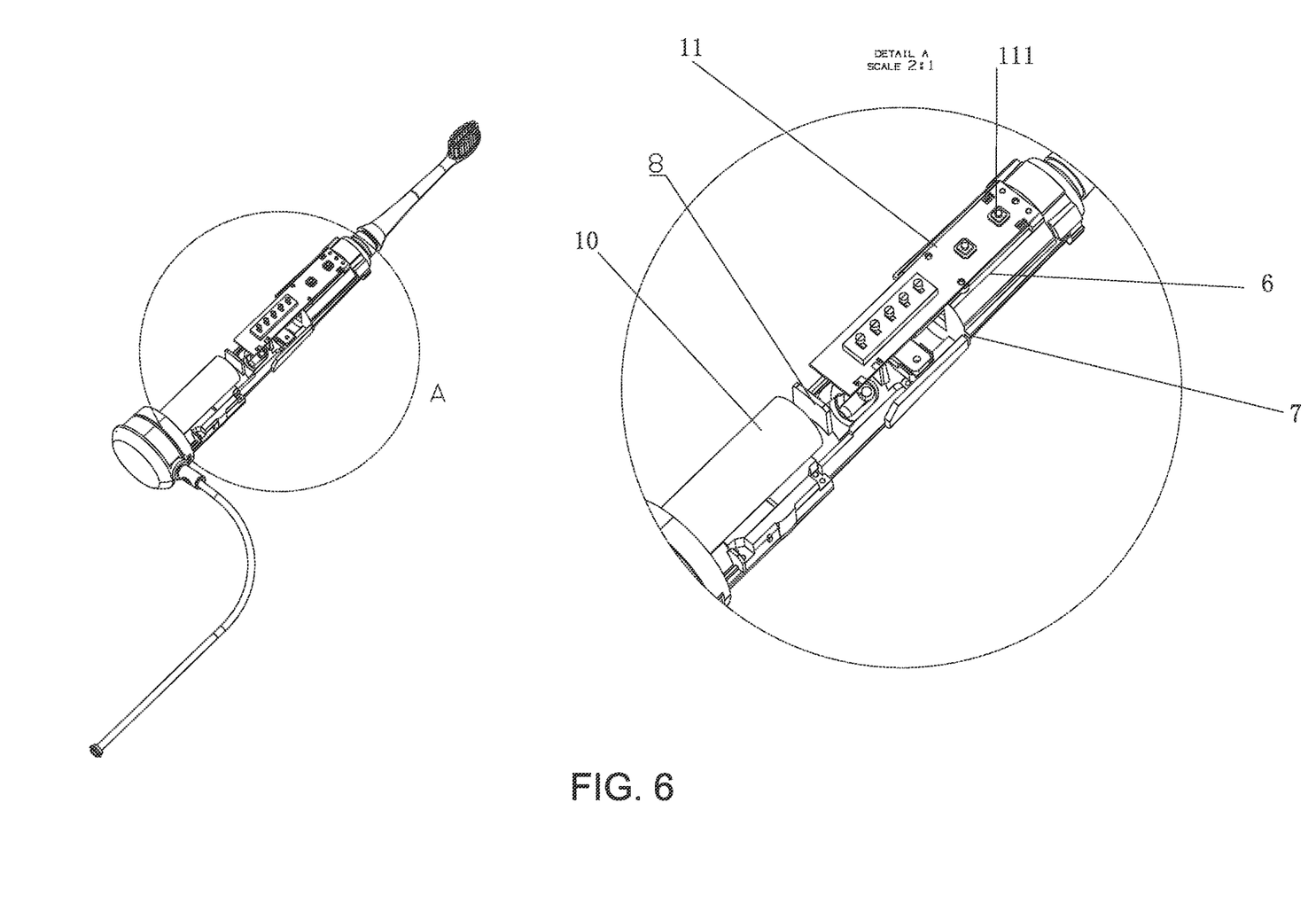
FIG. 6 is a schematic structural diagram of the control panel and function switch in the present invention.

Furthermore, a control panel 11 is installed on one side of the bracket body 1 7 and the bracket body 2 8, and a plurality of function switches 111 are welded on the control panel 11.

Figure 4:
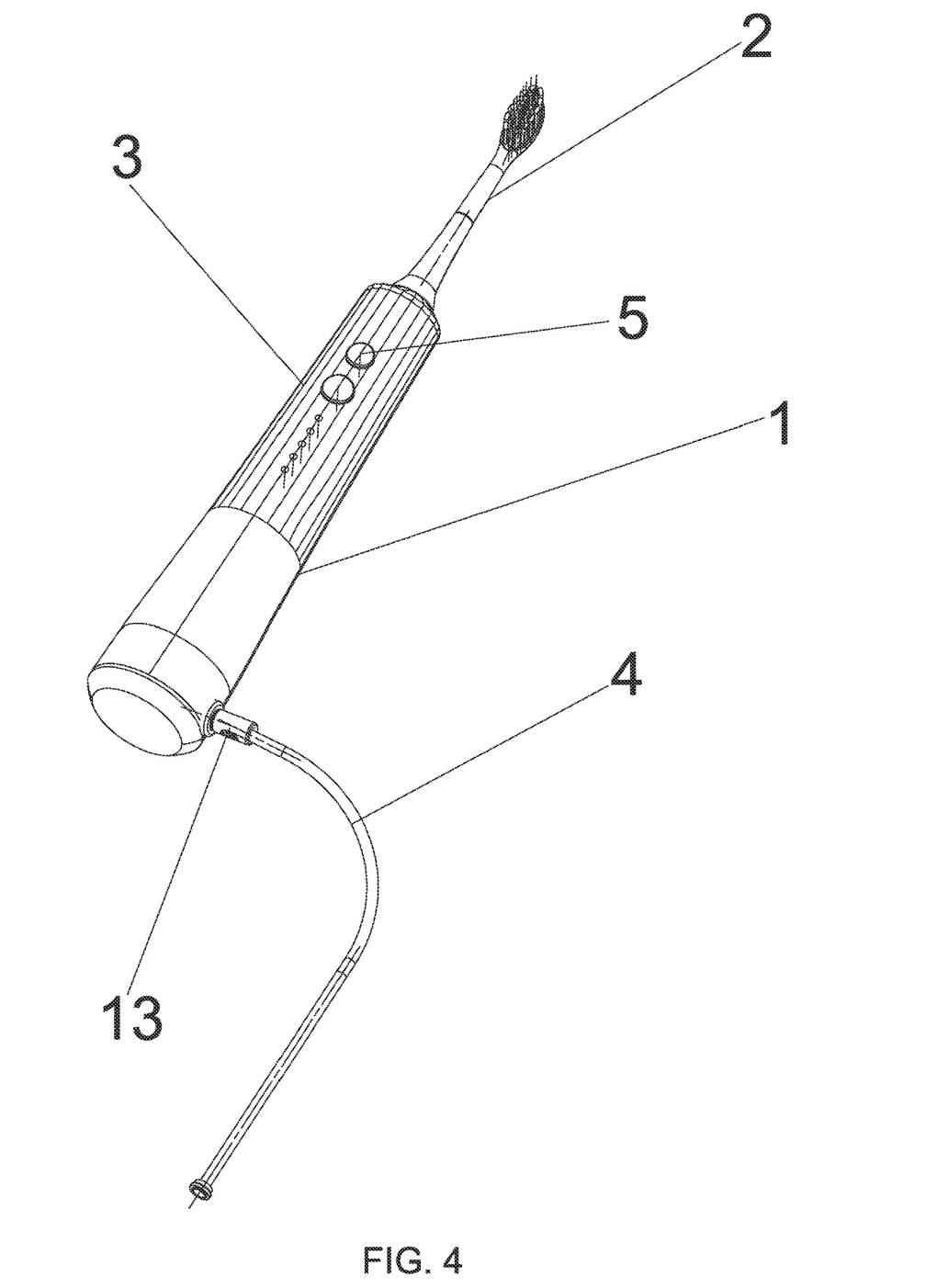
FIG. 4 is a schematic diagram of the overall structure of the present invention.

Furthermore, the surface of the housing 3 is provided with key bodies 5 at positions corresponding to the function switches 111, and the key bodies 5 penetrate through the housing 3 and are connected with the function switches 111 in a press manner, wherein the number of key bodies 5 is matched with the function switches 111.

Furthermore, the integrated device for washing and brushing teeth further comprises a battery 10 installed in the cavity of the housing 3, and the battery 10 is arranged on one side of the surface part of the bracket body 2 8.

Furthermore, the high-pressure water pump 92, the acoustic motor 6 and the ballet) 10 are all electrically connected to the control board 11.

Specifically, the end of the shell 3 is also fixed with an end cap 12 by screws or buckles, and one side of the end cap 12 is provided with an adapter 13;

One end of the adapter 13 is connected with a water inlet pipe 4;

The other end of the adapter 13 is communicated with the water inlet of the water pump assembly 9.

The Working Principle of the Invention

When the device is used, the corresponding function switch 111 is pressed, and the acoustic motor 6 is started. The acoustic motor 6 is specifically a magnetic suspension motor, and its vibration frequency is set at 32,000-50,000 Hz. At this time, the acoustic vibration can be used to help clean the oral cavity. If you want to further clean your mouth, press the function switch 111 corresponding to the high-pressure water pump 92. At this time, the water pump assembly 9 starts and the motor 92 rotates to drive the high-pressure water pump 91 to run. One end of the water inlet pipe 4 is connected to the water inlet of the high-pressure water pump 91, and the other end is inserted into an external liquid storage device. Under the rotation of the high-pressure water pump 91, the water in the liquid storage device is pumped into the high-pressure water pump 91 along the water inlet pipe 4. Under the high pressure of the high-pressure water pump 91, the water flows into the acoustic motor 6, passes through the water outlet hole in the vibration shaft 6, and finally enters the water outlet pipe 21 inside the toothbrush head 2. It is sprayed out from the water outlet hole 22, which effectively increases the water flushing area by arranging a plurality of water outlets 22. By arranging the high-pressure water pump 9 and selling the water pressure of the high-pressure water pump 91 to 90-180 PSI, the water pressure of the water outlet hole 22 is effectively increased, which can more effectively clean tartar and food residues between teeth, and further realize the functions of brushing teeth and flushing teeth at the same time.

Finally, the following points should be explained: First of all, in the description of this application, it should be explained that unless otherwise specified and limited, the terms "installation", "connection" and "connection" should be understood in a broad sense, which can be mechanical connection or electrical connection, internal communication of two elements, or direct connection, such as "upper", "lower", "left" and "right"

Secondly, in the drawings of the disclosed embodiments of the invention, only the structures related to the disclosed embodiments are involved, and other structures can refer to common designs, and the same embodiment and different embodiments of the invention can be combined with each other without conflict;

Finally, the above is only the preferred embodiment of the present invention, and it is not intended to limit the present invention. Any modification, equivalent substitution, improvement, etc. made within the spirit and principle of the present invention should be included in the scope of protection of the present invention.

What is claimed is:

1. An integrated device for washing and brushing teeth comprises a main body, wherein the main body comprises a toothbrush head, a shell, a water pump assembly and an acoustic motor communicated with the water pump assembly;
- the toothbrush head is installed at one end of the shell, a water outlet pipeline is arranged in the toothbrush head, and at least two water outlet holes communicated with the water outlet pipeline are formed on a bristle surface of the toothbrush head;
- an inside of the shell is provided with a cavity, and the water pump assembly and the acoustic motor are both installed in the cavity;
- the water pump assembly comprises a water pump and a motor matched with the water pump, wherein the water pump is a plunger pump or an electromagnetic pump, and a pressure of the water pump is set at 90-180 PSI;
- the acoustic motor is a magnetic suspension motor, and its vibration frequency is set at 32,000-50,000 Hz;
- wherein the integrated device for washing and brushing teeth further comprises a first bracket body and a second bracket body; the water pump assembly is arranged within the first bracket body or the second bracket body; the acoustic motor is arranged on the first bracket body and is close to one end of the toothbrush head, wherein the first bracket body and the second bracket body are connected by buckles or screws to fix the water pump assembly.

2. The integrated device for washing and brushing teeth according to claim 1, wherein a vibration shaft is arranged in the acoustic motor, and a water passing hole is formed in the vibration shaft;
- the water passing hole at one end of the vibration shaft is communicated with the water outlet pipeline inside the toothbrush head;
- the water passing hole at the other end of the vibration shaft is connected with a water outlet of the water pump assembly.

3. The integrated device for washing and brushing teeth according to claim 1, wherein a control panel is also installed on one sides of the first bracket body and the second bracket body, and a plurality of functional switches are welded on the control panel.

4. The integrated device for washing and brushing teeth according to claim 1, wherein a surface part of the shell is provided with key bodies at a position corresponding to the function switches the key bodies penetrate through the shell and are connected with the function switches, wherein the number of key bodies is matched with that of the function switches.

5. The integrated device for washing and brushing teeth according to claim 1, further comprising a battery installed in the cavity of the shell, and the battery is arranged on one side of a surface of the second bracket body.

6. The integrated device for washing and brushing teeth according to claim 1, wherein the water pump, the acoustic motor and the battery are all electrically connected with the control panel.

7. The integrated device for washing and brushing teeth according to claim 1, wherein the end of the shell is also fixed with an end cap by screws or buckles, and one side of the end cap is provided with an adapter;
- one end of the adapter is connected with a water inlet pipe;
- the other end of the adapter is communicated with a water inlet of the water pump assembly.

* * * * *